Oct. 27, 1959 W. S. DRUZ 2,910,526

SECRECY COMMUNICATION SYSTEM

Filed July 24, 1953 6 Sheets-Sheet 1

Oct. 27, 1959 W. S. DRUZ 2,910,526

SECRECY COMMUNICATION SYSTEM

Filed July 24, 1953 6 Sheets-Sheet 2

WALTER S. DRUZ
*INVENTOR.*

BY *Francis W. Crotty*

HIS ATTORNEY.

SECRECY COMMUNICATION SYSTEM

Filed July 24, 1953 6 Sheets-Sheet 3

WALTER S. DRUZ
*INVENTOR.*
BY Francis W. Crotty
HIS ATTORNEY.

WALTER S. DRUZ
INVENTOR.
BY Francis W. Crotty
HIS ATTORNEY.

WALTER S. DRUZ
*INVENTOR.*

BY Francis W. Crotty

HIS ATTORNEY.

SECRECY COMMUNICATION SYSTEM

Filed July 24, 1953 6 Sheets-Sheet 6

WALTER S. DRUZ
*INVENTOR.*

BY Francis W. Crotty

HIS ATTORNEY.

United States Patent Office 2,910,526

Patented Oct. 27, 1959

2,910,526

SECRECY COMMUNICATION SYSTEM

Walter S. Druz, Bensenville, Ill., assignor to Zenith Radio Corporation, a corporation of Delaware Application July 24, 1953, Serial No. 370,174

17 Claims. (Cl. 178—5.1)

This invention relates to secrecy communication systems in which an intelligence signal is transmitted in coded form to be utilized only in subscriber receivers equipped with decoding devices controlled in accordance with the coding schedule employed at the transmitter. The invention is particularly attractive when incorporated in a subscription television system and for that reason will be described in that environment.

Since the invention may be practiced in either a transmitter or receiver, the term "encoding" is used herein in its generic sense to encompass either coding at the transmitter or decoding at the receiver.

Subscription television systems have been proposed in which a television signal is coded with a very high degree of complexity by varying the mode of translation at a faster-than-field rate; that is, the television signal is coded by altering some characteristic thereof at intervals occurring more frequently than the field-scanning intervals. A system of this type is disclosed and claimed, for example, in copending application Serial No. 291,714, filed June 4, 1952, and issued April 21, 1959, as Patent 2,883,449, in the name of Carl G. Eilers et al., and assigned to the present assignee. In accordance with one embodiment of that copending application, a counting mechanism is actuated by line-synchronizing pulses to develop periodic square-wave coding signal having amplitude excursions each time the mechanism registers a predetermined count, for example, after every 15 line-trace intervals. This coding signal, in turn, actuates a coding device to effect mode changes in the television system between two modes of operation at a rate corresponding to the coding signal frequency. Mode variations are preferably established by varying the time relation between the video and synchronizing components of the television signal. Further secrecy is introduced by resetting the counting mechanism to a reference condition during spaced reset-time intervals, such as during randomly chosen field-retrace intervals, and indicating the schedule of such reset times to subscriber receivers by means of a transmitted key signal. Such a coding technique results in an image pattern at an unauthorized receiver wherein the entire picture is broken up into sections or groups of 15 line traces each, and by virtue of the fact that during some field-trace intervals the counting mechanism starts off in one condition whereas in other field-trace intervals the mechanism starts off in its other condition, these groups of line traces individually and independently "jitter" back and forth between the two operating modes, preferably in a very irregular fashion.

In copending application Serial No. 351,936, filed April 29, 1953, and issued December 21, 1954, as Patent 2,697,741, in the name of Erwin M. Roschke, and assigned to the present assignee, there is disclosed a television system which may be established in each one of at least four operating modes and in a periodic repeating sequence at a faster-than-field rate, each of the modes also preferably introducing a distinctive time relation between the video and synchronizing components of the television signal. This is accomplished by employing a cycling mechanism to actuate an encoding device, which has at least four operating conditions, at a faster-than-field rate so that the scrambled picture resulting at the image-reproducing device of an unauthorized receiver is divided into segments, individually comprising a predetermined number of line traces, that appear in any one of at least four operating modes. In this way, a multi-mode repeating pattern occurring at a faster-than-field rate may be developed.

While the patterns produced by the described systems of either one of the aforementioned applications may be greatly distorted, it may be desirable additionally to increase the coding complexity by further scrambling the picture at the unauthorized receivers. To this end, and in accordance with the present invention, a control or cycling mechanism, which may be similar to that described in the Roschke application, is employed to actuate a multi-mode encoder to each one of its operating conditions in a predetermined repeating sequence. However, instead of permitting the control mechanism to operate in its cyclic fashion for any sustained interval of time, such periodic operation is interrupted during spaced reset-time intervals, for example during field-retrace intervals, and the mechanism is selectively reset to any one of its multiplicity of operating conditions in accordance with a reset schedule which is made known only to subscriber receivers. Upon the termination of each reset-time interval, the control mechanism commences its sequential operation but starts from the operating step assumed during the interval, which step is determined preferably in a random manner. In this way, a very complex coding schedule is provided wherein an encoder having a plurality of operating conditions for establishing a corresponding number of operating modes in a subscription television system is operated in a predetermined repeating sequence and is reset to different ones of its operating conditions during different spaced reset-time intervals.

It is, accordingly, an object of the present invention to provide a new and improved secrecy communication system in which an intelligence signal is coded with a high degree of complexity.

It is another object of the invention to provide an improved subscription television system in which the mode of the transmitted television signal is varied at a relatively high rate to render unauthorized decoding extremely difficult.

It is still another object of the present invention to provide an improved secrecy communication system wherein mode changes are effected between a plurality of operating modes in a periodically recurring pattern which is interrupted at times to reset the system to different ones of the modes in accordance with a reset schedule.

It is a further object of the invention to provide an improved subscription television system having at least three modes of operation and employing faster-than-field mode changing in a repetitive predetermined sequence to produce an image at an authorized receiver which exhibits an extremely high degree of unintelligibility.

An additional object of the invention is to provide an improved subscription television system for utilizing a combination of encoding signal components to control the operation of a coding mechanism while utilizing one of the components within the combination for reset purposes.

A still further object of the invention is to provide an improved encoding system for use at the transmitter and/or receiver of a subscription television system which may employ faster-than-field coding.

In accordance with one aspect of the present invention, a subscription television system for translating a signal including video-signal components in recurring trace intervals and synchronizing-signal components in intervening retrace intervals comprises an encoding device having a plurality of distinct operating conditions each of which establishes a different operating mode in the system. A control mechanism is coupled to the encoding device and operates in response to an applied control signal for effecting actuation of the encoder between its operating conditions to encode the television signal in accordance with a predetermined code schedule. The system has means for applying a periodic control signal to the control mechanism to effect the actuation of the encoding device in a predetermined periodic repeating sequence. Means are provided for developing during at least some of the retrace intervals reset signals individually representing different reset information and collectively representing a predetermined reset schedule. Finally, the subscription television system comprises means coupled to the control mechanism and responsive to the reset signals for interrupting the periodic sequence and effecting actuation of the encoder during each of the last-mentioned retrace intervals to reset the encoding device to different operating conditions as determined at least in part by the reset information thereby to modify the code schedule in accordance with the reset schedule.

The features of this invention which are believed to be new are set forth with particularity in the appended claims. The invention, together with further objects and advantages thereof, may best be understood, however, by reference to the following description in conjunction with the accompanying drawings, in the several figures of which like reference numerals indicate like elements, and in which:

Figure 1:
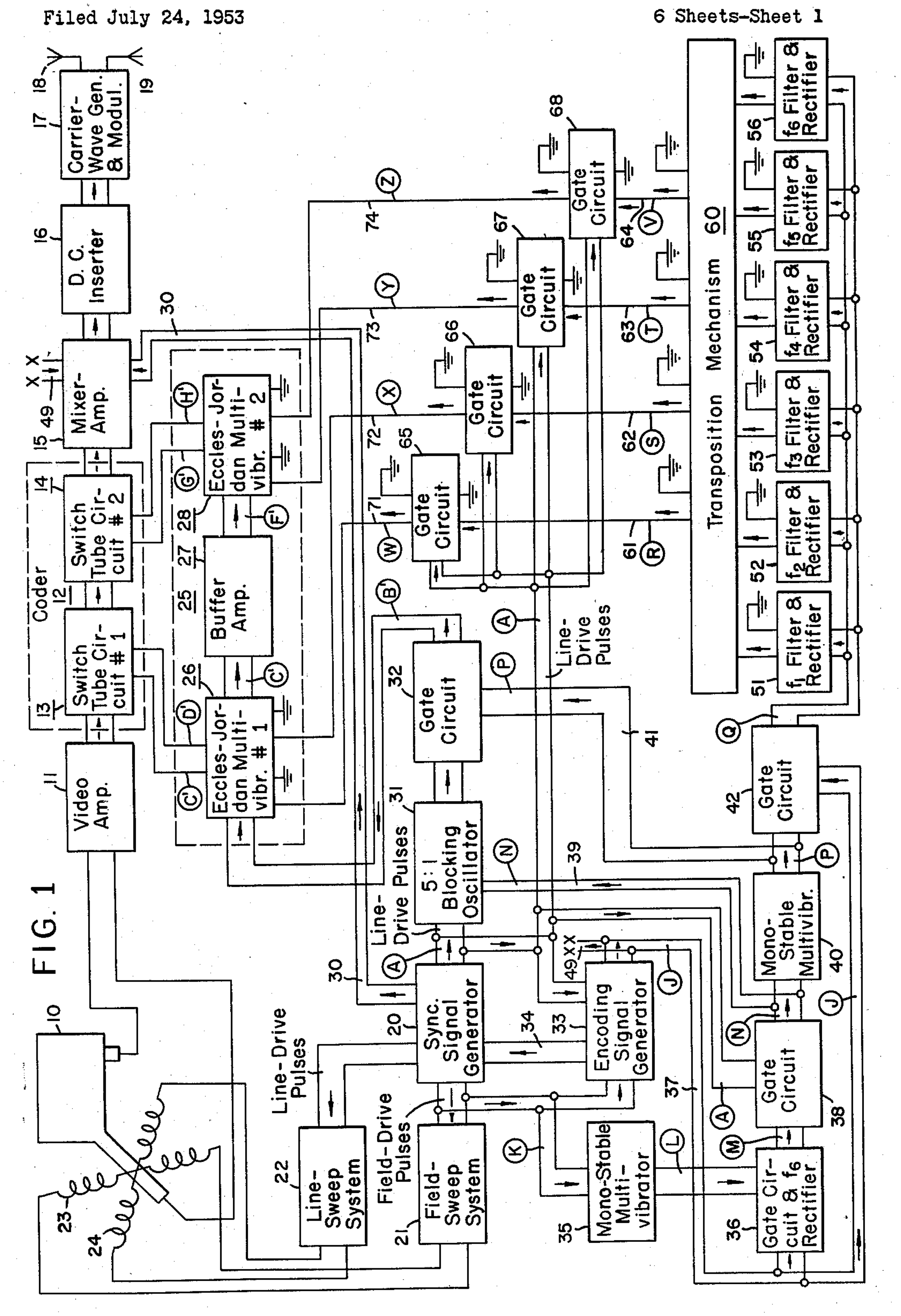
Figure 1 is a schematic representation of a subscription television transmitter constructed in accordance with the invention.
Figure 3:
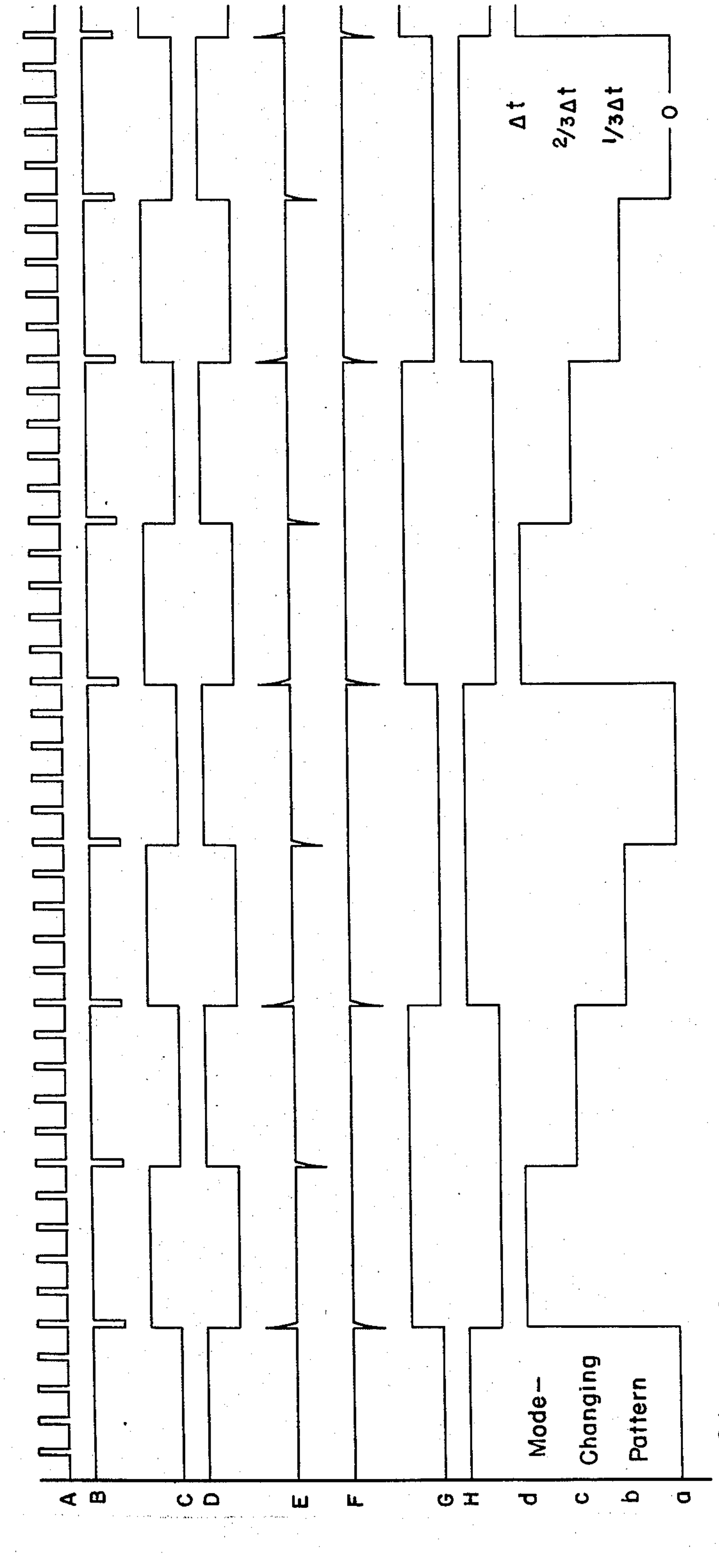
Figure 4:
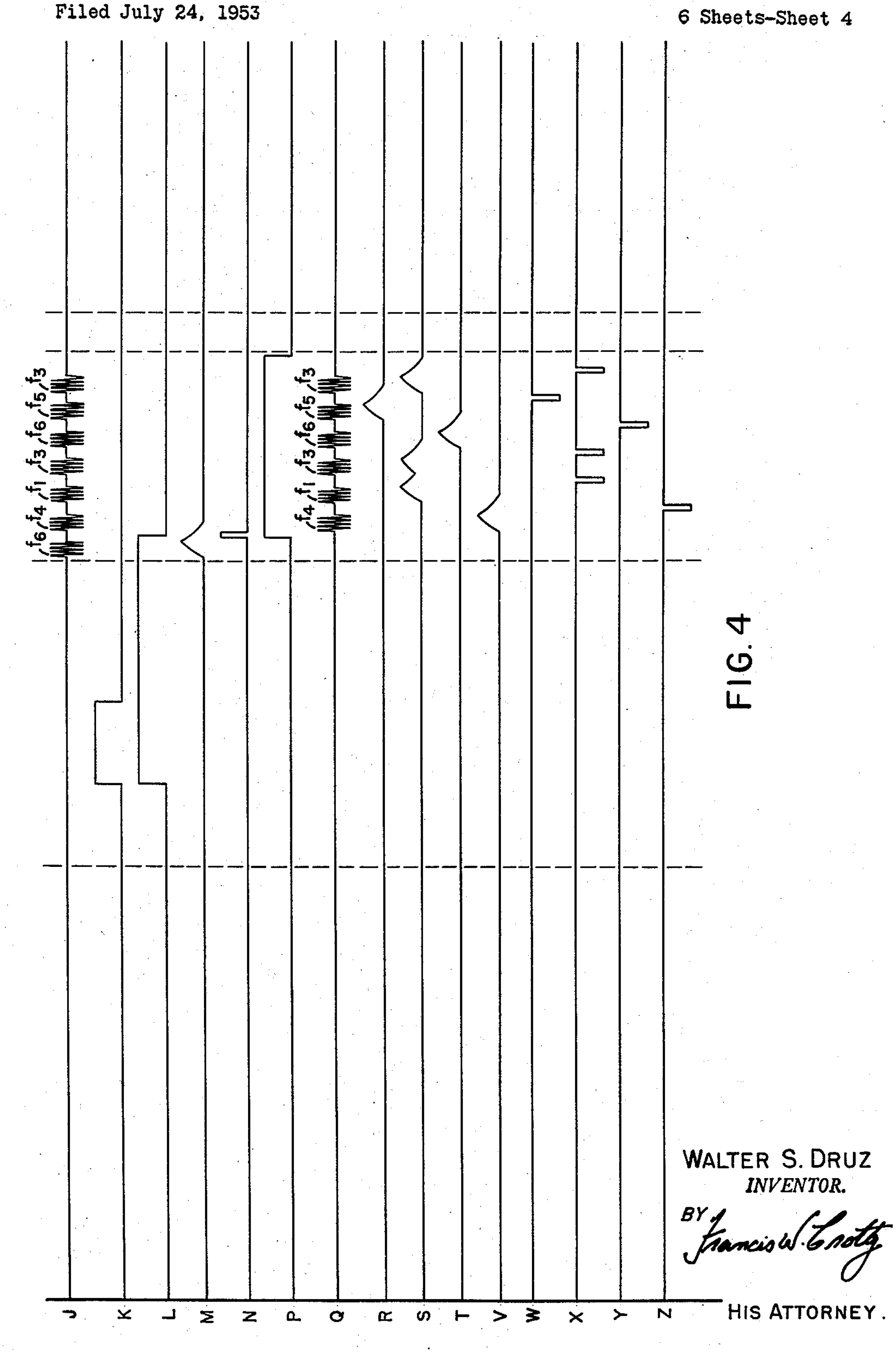
Figure 5:
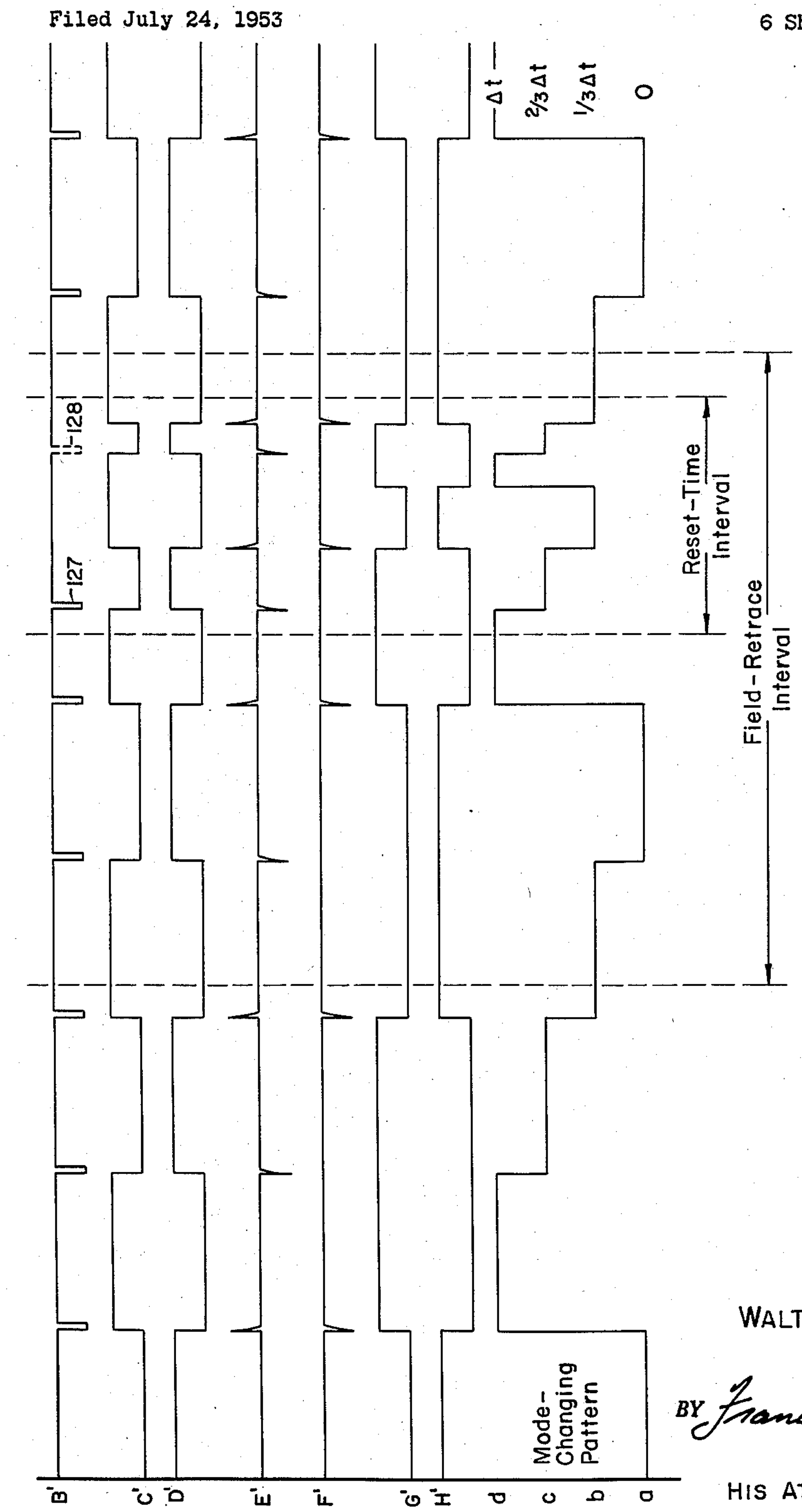
Figure 6:
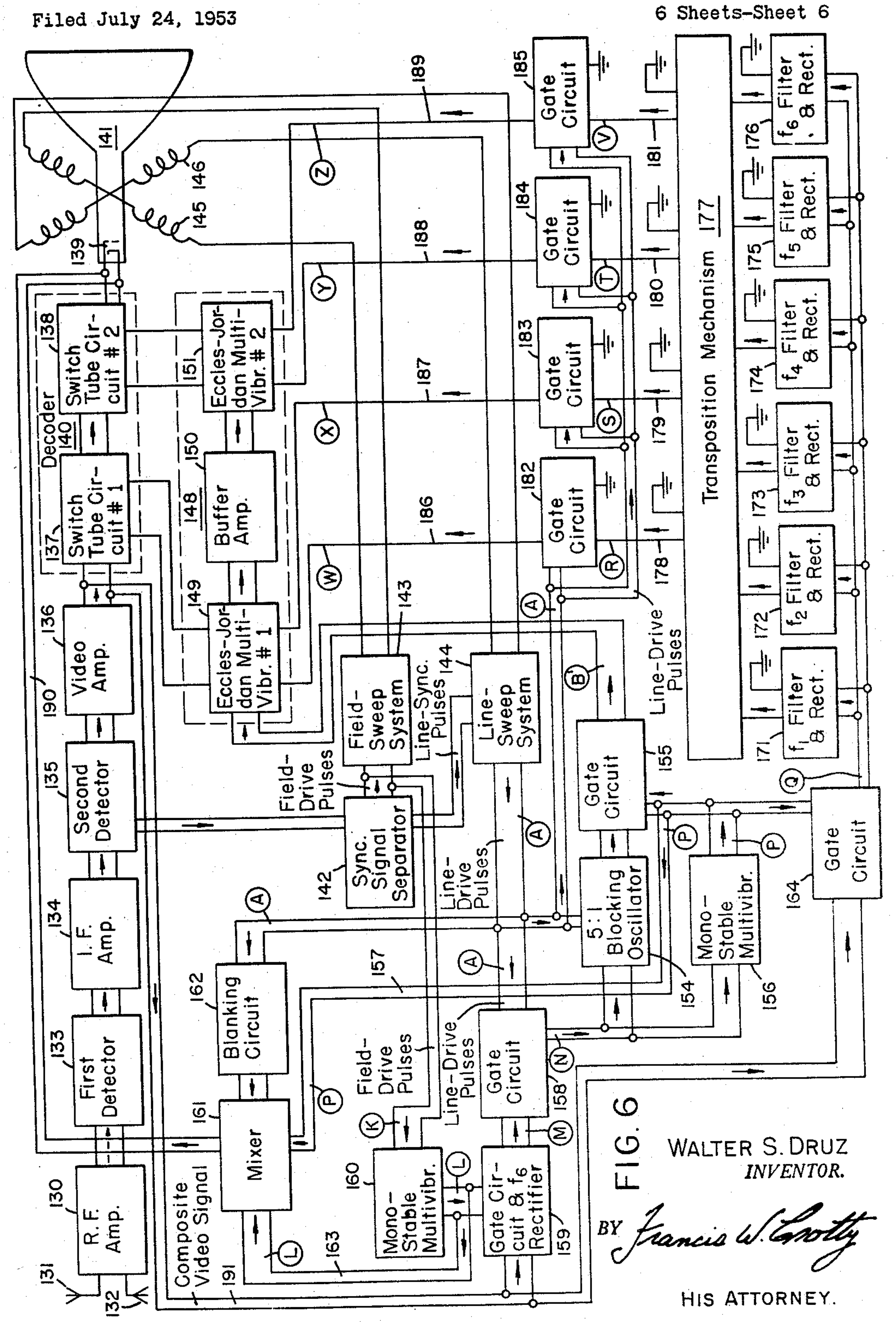

Figures 3, 4 and 5 taken together with Figure 4 placed immediately below Figure 3 and Figure 5 placed below Figure 4, illustrate a family of curves plus two mode-changing patterns related to those curves and are useful in explaining the operation of the system;

Figure 6 is a schematic representation of a subscription television receiver constructed in accordance with the invention for operation in conjunction with the transmitter of Figure 1.

The transmitter of Figure 1 includes a picture-converting device 10 which may be an iconoscope, image orthicon or other known device for deriving a video signal representing the image to be televised. The output terminals of device 10 are connected to a video amplifier 11 which, in turn, is connected to the input circuit of a switch tube circuit 13 constituting one portion of an encoding device or coder 12. The output terminals of switch tube circuit 13 are connected to the input terminals of a switch tube circuit 14 which constitutes the other portion of the encoder. The construction of this encoding device is to be described in detail hereinafter; it is sufficient to state at this time that coder 12 functions to selectively introduce various delay lines into the video channel to establish any one of four different time relationships between the video and synchronzing components of the composite video signal thereby to establish four correspondingly different operating modes in the television transmitter. Such intermittent variations in the relative timing of the video and synchronizing components effectively codes the television signal since conventional television receivers, not equipped with appropriate decoding apparatus, depend upon an invariant time relation of the video and synchronizing components of a received signal to reproduce the image intelligence represented thereby. The output circuit of coder 12, which is specifically the output circuit of switch tube 14, is connected to a mixer-amplifier 15 which, in turn, is connected through a direct-current inserter 16 to a carrier-wave generator and modulator 17. The output terminals of unit 17 are connected to an antenna 18, 19.

The transmitter also includes a synchronizing-signal generator 20 which supplies line- and field-synchronizing components and associated pedestal components to mixer-amplifier 15 over conductors 30. Generator 20 further supplies field- and line-drive pulses to a field-sweep system 21 and to a line-sweep system 22, respectively. The output terminals of sweep systems 21 and 22 are connected to the field-deflection elements 23 and the line-deflection elements 24, respectively, associated with picture-converting device 10.

Synchronizing-signal generator 20 additionally supplies line-drive pulses to a conventional 5:1 blocking oscillator 31 which has its output terminals connected to one pair of input terminals of a normally-open gate circuit 32. The output terminals of this gate circuit are connected to the input terminals of a conventional Eccles-Jordan multivibrator 26, which constitutes one portion of a control mechanism 25, such that the multivibrator is triggered from one to the other of its two stable operating conditions in response to successive applied pulses. Multivibrator 26 is coupled through a buffer amplifier 27 to the input terminals of another Eccles-Jordan multivibrator 28, units 27 and 28 constituting the remaining portion of control mechanism 25. The two multivibrators of the control mechanism have their output terminals connected to coder 12 and, as explained in detail hereinafter in connection with Figure 2, this control mechanism operates in response to an applied periodic control signal from gate circuit 32 to effect actuation of the encoding device between its operating conditions to encode the television signal in accordance with a predetermined code schedule.

Generator 20 also supplies field-drive pulses to one input circuit of an encoding signal generator 33 and line-drive pulses to another input circuit of the generator. Unit 33, which has one pair of output terminals connected to synchronizing-signal generator 20 over conductors 34 and another pair of output terminals connected over conductors 49 to a pair of input terminals of mixer-amplifier 15 through terminals designated X—X and over conductors 37 to a normally-closed gate circuit and $f_6$ rectifier 36 and also to a normally-closed gate circuit 42, is provided to develop during each of a series of spaced reset-time intervals, for example during each field-retrace period, a combination of encoding signal components individually having a predetermined identifying characteristic such as frequency and collectively determining a schedule in accordance with their order within the combination. Such a generator is disclosed and claimed in copending application Serial No. 326,107, filed December 15, 1952, and issued February 11, 1958, as Patent 2,823,252, in the name of Jack E. Bridges, and assigned to the present assignee, and thus is only shown in block diagram form in the present case to avoid unduly encumbering the application.

In the illustrated embodiment, and as is described in detail in the aforementioned Bridges application, the encoding signal generated during each reset-time interval may comprise a series of six bursts of any one of six various signal frequencies $f_1$–$f_6$ inclusive, preferably randomly sequenced and randomly appearing within the interval, plus a seventh burst of a predetermined fixed frequency which appears at the beginning of the combination for reset purposes, and all of these bursts are individually produced between the occurrence of the line-drive pulses superimposed on a vertical-blanking pulse. In the present illustration, it will be assumed that this seventh burst has a frequency identical to that of one of the other bursts in the combination and this may be accomplished simply by adjusting the reset-frequency generator in the Bridges disclosure to develop a signal having a frequency of one of the six employed, such as frequency $f_6$. This expedient has the obvious advantage of providing the same degree of security and flexibility with one less frequency.

In order to provide an actuating signal for normally-closed gate circuit and $f_6$ rectifier 36, field-drive pulses are applied to a mono-stable multivibrator 35 which has its output terminals connected to a pair of input terminals of the gate circuit. Unit 36 is, in turn, connected through another normally-closed gate circuit 38, which has a pair of input terminals connected to generator 20 to receive line-drive pulses therefrom, to a mono-stable multivibrator 40 and also over conductors 39 to a pair of input terminals of 5:1 blocking oscillator 31. The output terminals of multivibrator 40 are connected to another pair of input terminals of normally-closed gate circuit 42 and also over conductors 41 to another pair of input terminals of normally-open gate circuit 32. Encoding signal generator 33, gate circuits 36, 38 and 42, and mono-stable multivibrator 40 may be considered means for developing during at least some of the retrace intervals reset signals individually representing different reset information and collectively representing a predetermined reset schedule.

The encoding or reset signal components that are translated through gate circuit 42 are applied to the input circuits of a series of filter and rectifier units 51–56, each of which is selective to one of the different signal burst frequencies $f_1$–$f_6$, to facilitate their separation one from the other for selective application to a series of input circuits of a transposition mechanism 60. This mechanism, which is adjusted in accordance with a predetermined switch setting pattern, is provided merely for the purpose of selectively connecting any one of the six filter and rectifier units 51–56 to any one of four output circuits or conductors 61–64 and may comprise a family of toggle switches as shown in the aforementioned Bridges application or a wafer switch arrangement as disclosed in copending application Serial No. 338,033, filed February 20, 1953, in the name of George V. Morris, now abandoned in favor of continuation-in-part application Serial No. 407,192, filed February 1, 1954, now Patent No. 2,866,961, issued December 30, 1958 and assigned to the present assignee.

Conductors 61–64 are connected respectively to a series of normally-closed gate circuits 65–68, these gate circuits also individually having a pair of input terminals connected to synchronizing-signal generator 20 to derive line-drive pulses therefrom. The output circuits of gates 65 and 66 are connected over conductors 71 and 72 respectively to Eccles-Jordan multivibrator 26 and the output circuits of gates 67 and 68 are connected over conductors 73 and 74 respectively to Eccles-Jordan multivibrator 28. Thus, filter and rectifier units 51–56, transposition mechanism 60, gate circuits 65–68 and 32 may be considered means coupled to the control mechanism 25 and responsive to the reset signals for interrupting the periodic sequence and effecting actuation of the encoding device 12 during each of the reset-time intervals to reset the encoding device to different operating conditions as determined at least in part by the reset information thereby to modify the code schedule in accordance with the reset schedule.

Figure 2:
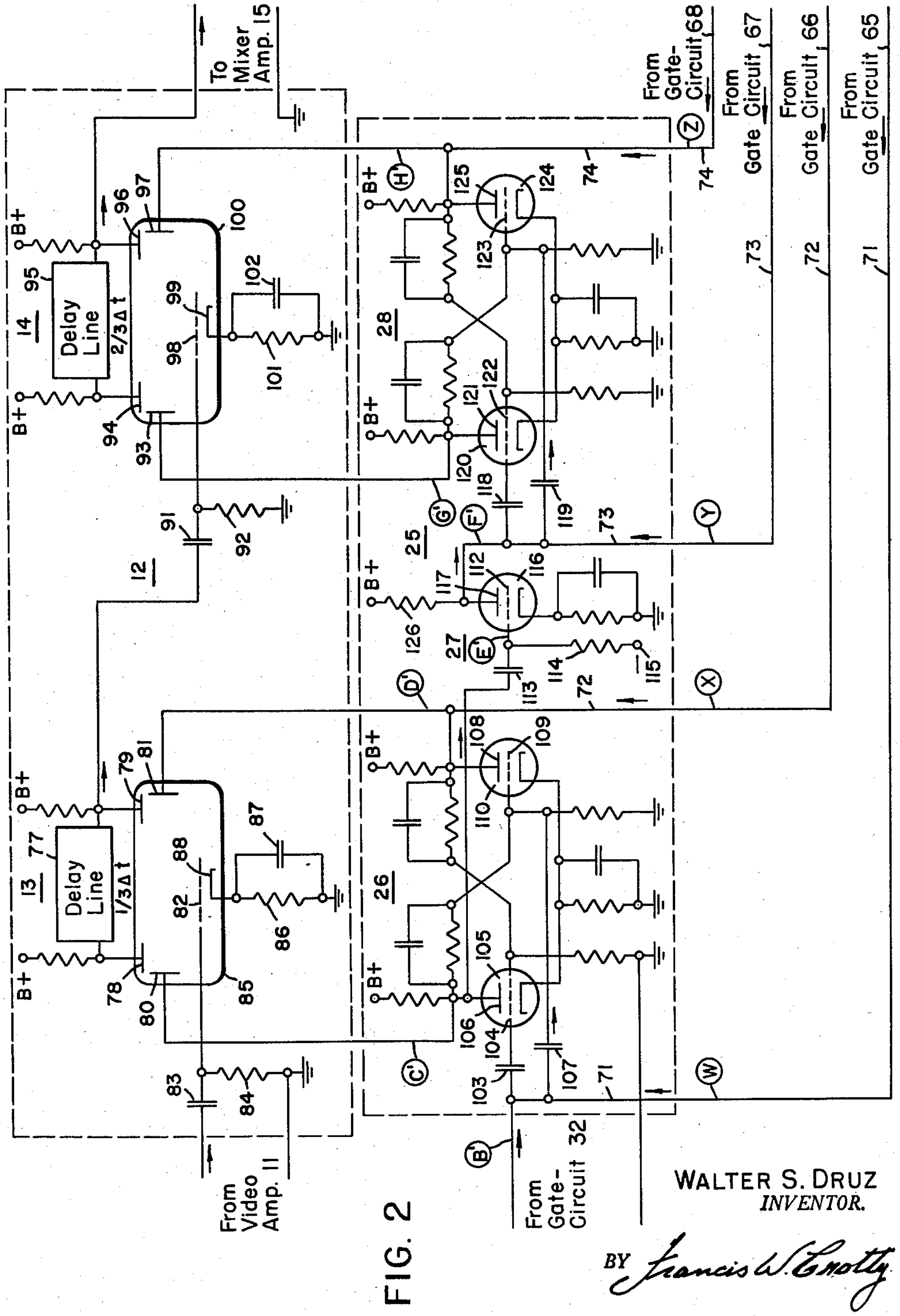
Figure 2 is a detailed schematic representation of a portion of the transmitter illustrated in Figure 1.

Reference is now made to the construction of encoding device 12 and control mechanism 25 and particularly to Figure 2 wherein these circuits are shown in detail. Coder 12 includes a pair of beam tubes 85 and 100 connected between video amplifier 11 and mixer-amplifier 15. Beam tubes 85 and 100 each comprise a cathode, an intensity-control grid, a pair of deflection-control electrodes, and a pair of output anodes or target electrodes and may be constructed, for example, in the manner shown and described in the copending application of Robert Adler, Serial No. 243,039, filed August 22, 1951, and issued February 7, 1956, as Patent 2,758,153, for "Subscription Television System," and assigned to the present assignee. One of the output terminals of video amplifier 11 is connected through a coupling condenser 83 to the intensity-control electrode 82 of beam tube 85, the control electrode being connected to ground through a grid-leak resistor 84 and the other output terminal of the video amplifier being also connected to ground. The cathode 88 of tube 85 is connected to ground through a cathode resistor 86 which is shunted by a condenser 87. One of the target electrodes 78 of tube 85 is coupled to the input terminal of a non-reflecting delay line 77 and also to the positive terminal of a source of unidirectional potential B+ while the target electrode 79 is coupled to the output terminal of delay line 77 and also to the positive terminal of a source of unidirectional potential B+. Delay line 77 is so constructed that it imparts a time delay of $\frac{1}{3}\Delta t$ to a signal impressed on its input terminals, where $\Delta t$ may be considered the maximum time delay introduced into the video channel at any one time.

Target electrode 79 and the output terminal of delay line 77 are coupled to the intensity-control electrode 98 of beam tube 100 by means of a condenser 91, the control electrode being connected to ground through a grid-leak resistor 92. The cathode 99 of tube 100 is connected to ground through a cathode resistor 101 which is shunted by a cathode by-pass condenser 102. One of the target electrodes 94 of tube 100 is coupled to the input circuit of a non-reflecting delay line 95 and to the positive terminal of a source of unidirectional potential B+, while the other target electrode 96 is coupled to the output terminal of delay line 95, to the positive terminal of a source of unidirectional potential B+, and also to the input circuit of mixer-amplifier 15. Delay line 95 is constructed to introduce a time delay of duration $\frac{2}{3}\Delta t$ to a signal impressed on its input terminals.

The operation of encoding device 12 may now be considered without regard for the additional circuitry included in the transmitter. The video signal developed at the output terminals of amplifier 11 is applied to control electrode 82 of beam tube 85 and intensity-modulates the electron beam developed therein. The video-modulated electron beam is directed either to target electrode 78 or to target electrode 79 under the control of deflection elements 80, 81 which may receive a deflection signal in a manner to be described. During intervals when the beam is directed to target 78, the video signal is impressed on control electrode 98 of beam tube 100 through a path including delay line 77 and is delayed a selected amount (namely $\frac{1}{3}\Delta t$) due to the inclusion of the delay line in the circuit. However, when the beam is directed to target electrode 79, the video signal is applied directly to control electrode 98 with no appreciable delay. Likewise, the electron beam of tube 100, video modulated by the signal thus applied to its control electrode 98, is directed to target electrode 94 or to target electrode 96 under the control of deflection elements 93 and 97 which may receive a deflection signal in a manner to be described. When the electron beam is directed to target 94, the video signal is applied to mixer-amplifier 15 over a path which includes delay line 95 and is delayed a selected amount (namely $\frac{2}{3}\Delta t$) due to the delay line, but when the electron beam is directed to target electrode 96, delay line 95 is removed from the video channel and no appreciable delay is imparted to the video signal in its translation through beam tube 100 to mixer-amplifier 15.

In any interval in which the electron beams in tubes 85 and 100 are directed respectively to targets 79 and 96, the video signal from amplifier 11 is supplied to mixer-amplifier 15 with no appreciable time delay relative to the synchronizing components supplied to the mixer from generator 20, and the transmitter may be considered as operating in a normal mode designated mode "*a*." When the electron beam in tube 85 is directed to target 78 and the beam in tube 100 is directed to target 96, delay 77 is introduced into the video channel, and the video signal is delayed a predetermined amount (namely $\frac{1}{3}\Delta t$) relative to the synchronizing components as determined by this delay line; in such an operating condition, the transmitter may be said to be operating in mode "*b*." When the beam in tube 85 is directed to target 79 and the beam in tube 100 is directed to target electrode 94, only delay line 95 is effective; the delay introduced by line 95 amounts to $\frac{2}{3}\Delta t$ and the transmitter may be considered as operating in mode "*c*." Finally, when the beam in tube 85 is directed to target electrode 78 and the beam in tube 100 is directed to target electrode 94, both delay lines 77 and 95 are effective and the delay of the video signal is determined by the total delay of the two lines, that is $\frac{1}{3}\Delta t+\frac{2}{3}\Delta t$, or $\Delta t$, to establish mode "*d*" operation. Therefore, by selective application of deflection signals to deflection elements 80, 81 and 93, 97 the operation of the transmitter may be switched between four modes, and variation of these deflection signals from time to time provides a highly complex coding schedule for the transmitted television signal.

The deflection of the electron beams in tubes 85 and 100 is controlled by conventional Eccles-Jordan multivibrators 26 and 28 of control mechanism 25. To this end, deflection electrode 80 is connected to the anode 106 of one electron-discharge device 105 of Eccles-Jordan multivibrator 26, while deflection electrode 81 is connected to the anode 108 of the other electron-discharge device 110 of multivibrator 26. Similarly, deflection element 93 is connected to the anode 121 of one electron-discharge device 120 of Eccles-Jordan multivibrator 28, while deflection electrode 97 is connected to the anode 125 of the other electron-discharge device 124 of multivibrator 28.

Control mechanism 25 is actuated through its sequence of operating steps by means of the periodic control signal which is applied from gate circuit 32 through a condenser 103 to the control electrode 104 of discharge device 105 and through a condenser 107 to the control electrode 109 of discharge device 110. The control electrode 112 of buffer amplifier tube 116 is connected to anode 106 through a condenser 113, control electrode 112 also being connected to a source of negative bias potential 115 through a resistor 114 which in combination with condenser 113 forms a differentiating circuit. The anode 117 of discharge device 116 is connected to B+ through a load resistor 126 and through condensers 118 and 119 to the control electrodes 122 and 123 of discharge devices 120 and 124 respectively. Output conductor 71 from gate circuit 65 is connected to control electrodes 104 and 109 through condensers 103 and 107 respectively, output conductor 72 from gate circuit 66 is connected to anode 108, output conductor 73 from gate circuit 67 is connected to control electrodes 122 and 123 through condensers 118 and 119 respectively, and output conductor 74 from gate circuit 68 is connected to anode 125.

The operation of the described transmitter will first be considered without regard to the technique of coding. Picture-converting device 10 produces video-frequency components representing the picture information to be televised and these components, after amplification in video amplifier 11, are supplied through coder 12 to mixer-amplifier 15. The mixer also receives the usual line- and field-synchronizing and blanking pulses over conductors 30 from generator 20 so that a composite video signal is developed therein. That signal is adjusted as to proper background level in direct-current inserter 16 and is amplitude modulated on the picture carrier in unit 17 to develop a composite television signal. The modulated video carrier is supplied to antenna 18, 19 for transmission to subscriber receivers. It will, of course, be understood that in the generation of the video-frequency components, sweep systems 21 and 22 are synchronized by the field- and line-drive pulses from generator 20. As in any television broadcast, the accompanying audio information is modulated on a sound carrier and concurrently radiated; however, the sound system may be entirely conventional and since it constitutes no part of the present invention, further description is omitted in order to avoid unnecessarily encumbering the drawing.

Briefly, coding of the video portion of the broadcast is accomplished by coder 12 under the influence of the deflection-control signals developed by control mechanism 25 which switch the beams of tubes 85 and 100 back and forth between their respective target electrodes. As previously explained, this actuation of the encoding device varies the operating mode of the transmitter by modifying the time relation of the video and synchronizing components of the radiated signal and thus achieves very effective coding.

In order to simplify the detailed explanation of the operation of the invention, idealized signal waveforms appearing at various portions of the transmitter indicated by encircled reference letters are given corresponding letter designations in the graphical representations of Figures 3–5. Consideration will now be given to the cyclic actuation of coder 12 without regard to the effect of the reset mechanism, by reference to the schematic diagrams of Figures 1 and 2 and the waveforms of Figure 3, disregarding the priming of the letter designations on the circuit diagrams. Positive-polarity line-drive pulses (waveform A) from generator 20 are applied to conventional 5:1 blocking oscillator 31 wherein they are effectively frequency-divided on a 5 to 1 basis so that a pulse of the same polarity is developed at the output terminals of unit 31 for every five line-drive pulses supplied thereto. The output signal from blocking oscillator 31 is applied to normally-open gate circuit 32 where it is phase-inverted to develop a signal having a wave form as shown in curve B, this latter signal being in turn applied to control electrodes 104 and 109 of the first multivibrator 26 of control mechanism 25. For convenience, bi-stable multivibrator 26 is assumed to be initially in its first stable operating condition wherein discharge device 105 is conductive and device 110 is non-conductive, as indicated by wave forms C and D which appear respectively at anodes 106 and 108, although the initial operating condition is immaterial since each pulse of wave form B is applied to the control electrodes of both tubes 105 and 110 and thus is effective to cut-off the conducting tube which ever one that may be. On application of the first pulse of wave form B, discharge device 105 is therefore made non-conductive, and by means of well-known multivibrator action device 110 becomes conductive. Similarly, in response to the second pulse of curve B, multivibrator 26 is again triggered inasmuch as the negative pulse is applied to control electrode 109 to cause device 110 to become non-conductive and device 105 conductive. Thus, by virtue of the fact that the negative pulses of curve B are always applied to the control electrodes of both tubes of multivibrator 26, this circuit is triggered between its operating conditions by successive B pulses, as shown by curves C and D.

The signal developed at anode 106, namely curve C, is also applied to the differentiating circuit 113, 114 to produce the signal of curve E. This latter signal is impressed on control electrode 112 of buffer amplifier device 116 which is normally biased beyond cut-off by means of the negative potential impressed on control electrode 112 from source 115; thus only the positive-polarity differentiated pulses of curve E are translated through the buffer stage with a normal 180° phase inversion. The signal of curve F therefore appears at anode 117 of device 116 and is impressed on control electrodes 122 and 123 of the second multivibrator 28 of control mechanism 25 via condensers 118 and 119 respectively to trigger multivibrator 28 between its two operating conditions in the same manner as explained with respect to multivibrator 26; since the pulses of wave form F correspond to alternate B pulses, the frequence of operation of multivibrator 28 is one-half that of multivibrator 26. The wave forms of curves G and H represent the signals appearing respectively at anodes 121 and 125.

From an analysis of the family of curves in Figure 3, it is apparent that the signals of curves C and D, which are applied to deflection elements 80 and 81 respectively to control the positioning of the electron beam of tube 85, as well as the signals of curves G and H, which are applied to deflection elements 93 and 97 respectively of tube 100, are in respective counterphase and thus provide balanced operation of the beam tube deflection elements. It is further to be noted from examining the extreme left-hand portions of the curves, that under the assumed initial operating conditions, the potential of deflection element 81 is positive with respect to the potential impressed on deflection electrode 80, and the potential of deflection electrode 97 is positive with respect to the potential appearing on deflection element 93. Thus, before the application of the first pulse of curve B, the electron beam of tube 85 is directed to target electrode 79 and the beam of tube 100 is collected by target element 96. The video signal is therefore channelled at this time from video amplifier 11 directly to mixer-amplifier 15 and consequently the transmitter is established in mode "*a*," the mode in which there is no appreciable time delay between the video and synchronizing components.

The corresponding mode-changing diagram has been shown on the bottom of Figure 3 to further illustrate the effect of the cycling feature of the encoding system in producing mode changes at a faster-than-field rate and in a regular repeating fashion.

In response to the first pulse of curve B, the relative potentials at deflection elements 80 and 81 are reversed due to the action of multivibrator 26 and the beam of tube 85 is thereby switched over to target electrode 78. Additionally, the beam of tube 100 is now directed to target 94 because of the reversal of the relative potentials on deflection elements 93 and 97 effected by the triggering of multivibrator 28. Both delay lines 77 and 95 are now interposed in the video channel so that the maximum time delay $\Delta t$ is introduced between the video and synchronizing components to establish the system in mode "*d*" operation, as illustrated in the mode-changing pattern.

When the second input pulse of waveform B is applied to the control mechanism, multivibrator 26 assumes its opposite condition, thus switching the beam of device 85 to target electrode 79 and effectively removing delay line 77 from the video circuit. However, multivibrator 28 is not triggered at this time so a time delay of $\frac{2}{3}\Delta t$, as contributed by delay line 95, is still functionally included in the video channel to establish the system in mode "*c*" operation, as represented by the corresponding interval in the mode-changing pattern. In response to the third pulse of curve B, both multivibrators are actuated so that delay line 95 is effectively removed and delay line 77 is inserted into the video channel, thus introducing a time delay of $\frac{1}{3}\Delta t$ for mode "*b*" operation. Finally, in response to the fourth input pulse to mechanism 25, multivibrator 26 operates to effectively remove delay line 77 from the video circuit to complete the cycle and bring the system back to mode "*a*" operation, as illustrated in the mode-changing pattern of Figure 3. Control or cycling mechanism 25 operates continuously as described to effect cyclic mode changes in the television system between four operating modes at a faster-than-field rate.

Consideration will now be given to the particular manner in which the control mechanism is interrupted and actuated during retrace intervals to reset the encoder to different operating conditions in accordance with the present invention, with particular reference to Figure 1 and the curves of Figures 4 and 5. It should be remembered that in order to maintain the correct time relationship between all of the various curves illustrated, Figure 4 should be placed immediately below Figure 3, and Figure 5 should be placed below Figure 4.

During any one particular field-retrace interval encoding signal generator 33 may develop a series of encoding or reset signal components, including an initial reset burst $f_6$, as shown in curve J of Figure 4.

Meanwhile, the field-drive pulse initiating the field retrace, shown in curve K, has been applied to the input terminals of conventional mono-stable multivibrator 35 causing actuation thereof from its normal or stable operating condition to its abnormal or unstable operating condition. This multivibrator automatically returns to its normal operating condition after a selected time interval determined by its internal cycling circuits to produce a pulse of curve L. The parameters of multivibrator 35 are so chosen that the trailing edge of this pulse always occurs at a point in time following the initial reset burst of frequency $f_6$. The pulse of curve L is impressed across one pair of input terminals of normally-closed gate circuit and $f_6$ rectifier unit 36 to provide a gating signal therefor. The encoding signal combination of curve J is applied to another pair of input terminals of unit 36 as well as to a pair of input terminals of gate circuit 42, and under the conjoint application of the encoding signals and the gating signal, the first burst only of the combination of curve J is accepted and rectified in unit 36 to produce the pulse of curve M. This latter signal is applied to normally-closed gate circuit 38, which is also supplied with the line-drive pulses of wave form A (Figure 3), to gate in the line-drive pulse of curve A occuring in time coincidence therewith. The pulse so gated in is shown in curve N and is utilized to trigger 5:1 blocking oscillator 31 and also mono-stable multivibrator 40. The effect of the pulse of curve N on blocking oscillator 31 is to be made apparent hereinafter.

Multivibrator 40, which is actuated to its abnormal or unstable condition by the pulse of wave form N, remains in that state for a selected duration before automatically returning to its stable operating condition thereby to produce the pulse of curve P. This pulse is impressed on normally-open gate circuit 32 to close that gate for the pulse duration thereby to prevent the application of any pulses from blocking oscillator 31 to control mechanism 25 during the reset-time interval. The periodic operation of the mechanism is thus temporarily interrupted or halted.

The pulse of curve P is also applied to normally closed gate circuit 42 to open that gate and permit the translation of such of the encoding signal components of curve J that occur within the pulse duration. All of the signal bursts with the exception of the very first, namely the $f_6$ reset signal, are therefore separated from the combination of curve J to supply the signal of curve Q to the filter and rectifier units 51—56. The encoding or reset signal components are separated from one another and rectified in the rectifier circuits for individual application to the various input circuits of transposition mechanism 60.

The transposition mechanism establishes prescribed circuit connections between its input circuits and output conductors 61—64 so that the rectified components may be supplied to normally-closed gate circuits 65—68 in accordance with a code schedule. For purposes of illustration, it may be assumed that mechanism 60 is so adjusted that $f_5$ filter and rectifier unit 55 is connected to conductor 61 to supply the rectified $f_5$ burst of curve R to gate circuit 65, that $f_1$ filter and rectifier unit 51 and $f_3$ filter and rectifier unit 53 are both connected via transposition mechanism 60 to conductor 62 to supply the rectified $f_1$ and $f_3$ bursts as shown in curve S to gate circuit 66, that $f_6$ filter and rectifier unit 56 is connected through the transposer to conductor 63 to apply the rectified $f_6$ burst of curve T to gate circuit 67, and finally, that $f_4$ filter and rectifier unit 54 is connected by means of transposition mechanism 60 to conductor 64 to impress the rectified $f_4$ burst of curve V on gate circuit 68. Filter and rectifier unit 52 may also, of course, be connected to any selected one of output conductors 61—64 through the transposition mechanism but inasmuch as no $f_2$ burst occurs in the assumed encoding signal combination, this rectifier unit is ineffective.

Normally-closed gate circuits 65—68 also receive line-drive pulses (wave form A of Figure 3) from generator 20, and the signals of curves R, S, T and V gate in the line-drive pulses of curve A that occur in time coincidence with each individual gating pulse, so that the signals of curves W and X are supplied over conductors 71 and 72 respectively to Eccles-Jordan multivibrator 26 and the signals of curves Y and Z are translated over conductors 73 and 74 respectively to Eccles-Jordan multivibrator 28.

In Figure 5, curves B′, C′, D′, E′, F′, G′ and H′ illustrate the modifying effect of the reset mechanism of the present invention on the waveforms of curves B, C, D, E, F, G and H respectively, and a modified mode-changing pattern is also included to exemplify the effect of the reset operation on the code schedule. For convenience, it may be assumed that the cyclic operation of the encoding system during the first field-trace interval under consideration is precisely as described in connection with the wave forms and mode-changing pattern of Figure 3. However, the first signal burst occurring during a field-retrace interval (the $f_6$ reset burst of curve J) causes a pulse (curve N) to be applied to blocking oscillator 31; this causes premature actuation of the blocking oscillator and momentarily disrupts its 5:1 count, as indicated by pulse 127 of wave form B′. Multivibrator 26 is therefore actuated prematurely (i.e. at the start of the reset-time interval instead of two counts later as in the case of cyclic operation discussed in connection with Figure 3) to establish the system in mode "*c*" operation, as shown in the mode changing pattern of Figure 5. Blocking oscillator 31 then resumes its normal 5:1 count. The pulse of curve P, extending throughout the entire code burst interval of curve Q, is meanwhile applied to normally open gate circuit 32 to close that gate and prevent the translation of pulses from blocking oscillator 31 to control mechanism 25 during that interval, with the result that the next pulse 128 from the blocking oscillator, indicated in dotted outline in wave form B′, is not translated to control mechanism 25; however, pulse 128 does initiate a normal 5:1 counting cycle of blocking oscillator 31.

In response to the next burst of curve J, which is really the first burst of the code burst combination of curve Q, namely the $f_4$ burst, the pulse of curve Z is applied to control electrode 122 of device 120 (Figure 2) over the cross-coupling circuit from anode 125, and since that device is already in its non-conductive state (as shown by curve G′) the applied negative pulse is not effective. Consequently, no mode change is accomplished. However, when the next burst of curve J is received in the system, that is the $f_1$ burst, the first pulse of curve X is impressed on control electrode 104 of device 105 over the cross-coupling network from anode 108, and finding device 105 in a conductive state, is effective to cut off the device. Multivibrator 26 therefore changes operating conditions and, in turn, causes multivibrator 28 to assume its opposite condition. The beams of tubes 85 and 100 are switched over to targets 78 and 96 respectively and thus the television system is established in mode "*b*."

When the succeeding burst of curve J occurs, that is the $f_3$ burst, the second pulse of curve X is applied to control electrode 104 of tube 105, but since that tube is then cut-off the pulse has no effect. The next occurring burst in the combination ($f_6$) causes translation of the pulse of curve Y to control electrodes 122 and 123 of devices 120 and 124, respectively. Multivibrator 28 is thus actuated to its opposite condition as shown by curves G′ and H′, and the beam of tube 100 is switched to target electrode 94, thereby establishing the system in mode "*d*."

In response to the next burst in the combination, that is the $f_5$ burst, the pulse of curve W is impressed on control electrodes 104 and 109 of devices 105 and 110, respectively, to trip multivibrator 26 to its other condition. Delay line 77 is thus effectively removed from the video channel and the system assumes mode "*c*" operation. Finally, in response to the last signal burst of the combination of curve J, namely the $f_3$ burst, the last pulse of curve X is impressed on control electrode 104 of tube 105 and, as this stage is in its conductive state, the pulse is effective to cut the tube off and change operating conditions. The beam of tube 85 is therefore directed to target element 78 by the operation of multivibrator 26 to include delay line 77 in the video channel; at the same time multivibrator 26 also effects actuation of multivibrator 28, thus effectively switching the beam of tube 100 to remove delay line 95 from the video channel. The system is consequently established in mode "*b*" as illustrated in the mode changing diagram of Figure 5, and this is the mode of operation from which the system will start off upon the resumption of control of cycling mechanism 25 by the periodically recurring pulses from blocking oscillator 31. Thus, in response to the first pulse of curve B′ succeeding the reset-time interval, mechanism 25 is actuated as previously described to commence its cyclic operation.

From a comparison of the mode-changing patterns of Figures 3 and 5, it is apparent that the cyclical operation of the encoding system is interrupted during a field-retrace interval and established at any one of its operating steps in the cycle at random to establish a new initial operating condition at the start of the next field-trace interval when cyclical mode changing is resumed.

In order that subscriber receivers may utilize the coded transmission, it is necessary that the combination of encoding or reset signal components of curve J be made known to such subscriber receivers. To that end, the encoding signal is applied to mixer-amplifier 15 via conductors 49 to be combined with the composite video signal for transmission to subscriber receivers. The signal bursts of various frequencies, which constitute the encoding or reset signal components, occur between the line-drive pulses superimposed on the vertical or field-retrace blanking pulse, and therefore it is desirable that the amplitude level of the blanking pulse be modified to effect an inward modulation by the encoding signal components. To that end, the encoding signal bursts are pedestalled on suitable pulses of a peak amplitude below "black level" supplied from synchronizing-signal generator 20 to produce suitable modulating pulses which, in turn, are supplied to mixer-amplifier 15 over conductors 30 to downward modulate the vertical blanking pulse at the appropriate times.

It is, of course, evident that the utilization of the video carrier to convey the encoding or reset information is immaterial to the inventive concept and that such information may be distributed in whole or in part in other manners, as for example in the form of auxiliary modulation of the sound carrier or of a separate carrier, or by means of a line circuit extending from the transmitter to a subscriber receiver. Moreover, it is contemplated that such coding or reset information may even be developed locally as for example by means of a code card provided with suitable perforations or printed circuits.

It should be mentioned at this time that in the particular illustration the encoding signal components are produced during a portion of the vertical-retrace interval so that resetting of the control mechanism is effected between field-trace intervals. However, it should be understood that the encoding or reset signal may be developed and utilized at any time during a field-trace interval, particularly in the event that the encoding or reset information is distributed to authorized receivers in one of the alternative manners mentioned above.

It might also be stated at this point that the reset-time intervals may recur at a non-uniform or random rate and at intervals either longer or shorter than a field-trace interval. If the encoding system is allowed to run continuously for a number of field or frame intervals before resetting is accomplished, the picture gives the appearance or illusion of "walking" or "rolling" toward the top or bottom of the image screen. This effect obtains since an encoding arrangement which produces mode changes upon the completion of a sequence of operating steps, when the number of operating steps is not an even sub-multiple of the number of line intervals per frame, assumes different operating conditions at the beginning of succeeding frames so that mode changes do not occur at corresponding line traces of successive frames. Such a coding technique is described and claimed in copending application Serial No. 700,855, filed December 5, 1957, as a continuation of application Serial No. 259,169, originally filed November 30, 1951, in the name of Jacob M. Sacks and assigned to the present assignee. This "walking" effect is achieved in the system described in the present application, under the assumed operating conditions, so long as resetting is not accomplished as often as once per frame interval, since control mechanism 25 requires 20 line-trace intervals to execute one complete cycle of operation and this number is not integrally related to the number of line traces in a frame interval (525 under present United States Standards).

The receiver of Figure 6, which may utilize the subscription telecast from the transmitter of Figure 1, includes a radio-frequency amplifier 130 having input terminals connected to an antenna 131, 132 and output terminals connected to a first detector 133. The first detector is connected through an intermediate-frequency amplifier 134 to a second detector 135 which, in turn, is connected to a video amplifier 136. The video amplifier is coupled through an encoding device or decoder 140 to the input electrodes 139 of a cathode-ray image-reproducing device 141. Decoder 140 may be constructed in a similar manner as coder 12 at the transmitter (Figures 1 and 2) with the exception that it is controlled to operate in a complementary fashion in order effectively to compensate for the variations in the timing of the received television signal. More particularly, when coder 12 imparts a delay of $\Delta t$ to the video components, decoder 140 translates the video signal to the image reproducer with no appreciable time delay. Similarly, when coding device 12 is in the "zero delay" condition, decoder 140 is in the "$\Delta t$ delay" condition; when coder 12 is in the "$\frac{1}{3}\Delta t$ delay" condition, decoder 140 is in the "$\frac{2}{3}\Delta t$ delay" condition; and finally, when unit 12 is in the "$\frac{2}{3}\Delta t$ delay" condition, decoding device 140 is in the "$\frac{1}{3}\Delta t$ delay" condition. Thus, for example, decoder 140 may be of precisely the same construction as coder 12 (Figure 2) except that the circuit connections of either the target electrodes or the deflectors of each beam tube must be reversed or interchanged.

Second detector 135 is also coupled through a synchronizing-signal separator 142 to a field-sweep system 143 and to a line-sweep system 144. The output terminals of sweep systems 143 and 144 are connected respectively to field-deflection elements 145 and line-deflection elements 146 associated with reproducing device 141. Line-drive pulses are derived from sweep system 144 and supplied to a 5:1 blocking oscillator 154 which, in turn, is connected to a normally-open gate circuit 155. The output terminals of gate 155 are connected to an Eccles-Jordan multivibrator 149 which constitutes one portion of a control mechanism 148. Multivibrator 149 is connected to a buffer amplifier 150 which in turn is connected to a second Eccles-Jordan multivibrator 151, amplifier 150 and multivibrator 151 constituting the remaining portion of control mechanism 148. Multivibrator 149 has output terminals connected to a switch tube circuit 137 to control one portion of decoder 140, and multivibrator 151 has output terminals connected to a switch tube circuit 138 to provide a control signal for the other portion of the decoder.

In order to facilitate the separation of the encoding signal components from the composite television signal, it is desirable to provide circuitry for selecting or "gating in" only that portion of the composite video signal containing such components. To that end, field-drive pulses are derived from synchronizing-signal separator 142 and supplied to a mono-stable multivibrator 160 having output terminals connected to a normally-closed gate circuit and $f_6$ rectifier 159. The output terminals of video amplifier 136 are also connected over conductors 191 to gate circuit 159 to supply the composite video signal thereto, and the output circuit of this gate is connected to one pair of input terminals of a normally-open gate circuit 158 which has another pair of input terminals connected to sweep system 144 to receive line-drive pulses therefrom. Gate circuit 158 is connected to a mono-stable multivibrator 156 and also to another pair of input terminals of blocking oscillator 154, the mono-stable multivibrator being in turn connected to another pair of input terminals of gate circuit 155 and also to a pair of input terminals of a normally-closed gate circuit 164.

Gate circuit 164 has another pair of input terminals connected to video amplifier 136 via conductors 191 to receive the composite video signal and has its output terminals connected to the input circuits of each one of a series of filter and rectifier units 171—176, the output circuits of these units being connected to the input terminals of a transposition mechanism 177 which is preferably similar to mechanism 60 at the transmitter. Accurate decoding of the received signal is effected only if the various interconnections established by mechanism 177 are identical to the interconnections established by the transposer at the transmitter. The mechanism switch setting information is disseminated only to authorized subscribers and a suitable charge may, of course, be assessed for such information.

Transposition mechanism 177 has four output conductors 178—181 connected respectively to input terminals of a series of normally-open gate circuits 182—185. Line-drive pulses from sweep system 144 are also supplied to each one of the gate circuits, and the output circuits of gates 182 and 183 are connected respectively over conductors 186 and 187 to input terminals of multivibrator 149, while the output circuits of gates 184 and 185 are connected respectively over conductors 188 and 189 to input terminals of multivibrator 151.

The described circuitry included in the receiver, aside from that conventionally required for normal television reception, may be exactly the same as that discussed in greater detail in connection with the transmitter, except for the reversal of connections to the deflectors or target electrodes of each beam tube of decoder 140 as described above. Blocking oscillator 154, gate circuit 155, control mechanism 148, mono-stable multivibrator 160, gate circuit and $f_6$ rectifier 159, gate circuit 158, mono-stable multivibrator 156, gate circuit 164, filter and rectifier units 171—176, transposer 177, and gate circuits 182—185 are identical in construction and perform the same functions as corresponding components 31, 32, 25, 35, 36, 38, 40, 42, 51—56, 60, and 65—68 in the transmitter of Figure 1.

In the operation of the receiver of Figure 6, the coded television signal from the transmitter of Figure 1 is intercepted by antenna 131, 132, amplified by radio-frequency amplifier 130 and heterodyned to the selected intermediate frequency of the receiver in first detector 133. The resulting intermediate-frequency signal is amplified in intermediate-frequency amplifier 134 and detected in second detector 135 to produce a composite video signal. This latter signal is amplified in video amplifier 136 and translated through decoder 140 to the input terminals 139 of image-reproducing device 141 to control the intensity of the cathode-ray beam of the device in well-known manner.

The synchronizing components are separated in separator 142, the field-synchronizing components being utilized to synchronize sweep system 143 and, hence, the field scansion of image reproducer 141, whereas the line-synchronizing components are utilized to synchronize sweep system 144 and, therefore, the line scansion of device 141. Of course, the sound-modulated carrier received along with the video carrier is translated in the usual way through an audio system which has been omitted from the drawings for purposes of simplicity.

Decoding at the receiver is accomplished in the identical manner as explained hereinbefore in connection with the coding operation at the transmitter; accordingly, the wave forms of Figures 3–5 are illustrative of receiver as well as transmitter operation, and corresponding letter designations are assigned to the receiver diagram of Figure 6 where appropriate. Briefly, blocking oscillator 154 supplies actuating pulses through gate circuit 155 to control mechanism 148 which functions in a cyclic manner to produce a periodically recurring mode-changing or rather mode-change-compensating pattern. The composite video signal is continuously applied to normally-closed gate circuit 159 but by virtue of the gating pulse of curve L produced by mono-stable multivibrator 160, only the initial $f_6$ reset burst is rectified to permit gate circuit 158 to gate-in the line-drive pulse of curve N. This pulse resets blocking oscillator 154 and actuates mono-stable multivibrator 156 to produce the gating pulse of curve P for closing gate circuit 155 and opening gate circuit 164. Gate 164 is also continuously supplied with the composite video signal so that the pulse of curve P effects the application of the bursts of curve Q to filter and rectifier units 171—176 wherein such bursts are segregated one from another for selective application through transposer 177 to conductors 178—181. The rectified bursts of curves R, S, T, and V are respectively applied to gate circuits 182—185 and gate in the signals of curves W and X to multivibrator 149 and the signals of curves Y and Z to multivibrator 151. If the setting of transposition mechanism 177 corresponds to that employed at the corresponding mechanism 60 at the transmitter, control mechanism 148 operates exactly as previously described for the corresponding transmitter control mechanism 25. As previously explained, decoder 140 functions in precisely the same manner as coder 12 at the transmitter, except in a complementary fashion, to effect intelligible image reproduction.

The receiver of Figure 6 has one feature which has no counterpart in the transmitter of Figure 1. Specifically, a mixer 161 is connected via conductors 163 to the output terminals of mono-stable multivibrator 160 to derive the pulse of curve L therefrom, over conductors 157 to the output terminals of mono-stable multivibrator 156 to receive the pulse of curve P, and is further connected to a blanking circuit 162 which receives line-drive pulses from sweep system 144. Mixer 161 has its output terminals connected via conductors 190 to input electrodes 139 of image reproducer 141 and the purpose of this mixer is to supply a blanking signal during field-retrace as well as line-retrace intervals to thereby insure complete blanking of the picture tube during such intervals. This feature is desirable inasmuch as the encoding or reset signal components developed during field-retrace may cause the composite television signal to fall below "black level" during such intervals and thereby illuminate the retrace. Additionally, blanking is desirable during line-retrace inasmuch as the switching action of decoder 140 is accomplished during selected line-retrace intervals and transient pulses developed at that time might otherwise energize the electron beam of reproducer 141.

Certain features disclosed in the present application are also described and claimed in copending application Serial No. 700,854, filed December 5, 1957, in the name of Myron G. Pawley et al., constituting a divisional application of copending application Serial No. 230,618, filed June 8, 1951, and issued December 10, 1957, as Patent 2,816,156; and copending application Serial No. 310,309, filed September 18, 1952, in the name of Alexander Ellett, all of which are assigned to the present assignee.

This invention provides, therefore, a secrecy communication system wherein mode changes between a plurality of modes of operation are effected in a cyclic manner and in which the periodic operation is interrupted at times to reset the encoder to different ones of its operating modes from time to time in order to modify the cyclic code schedule in accordance with the predetermined reset schedule.

While particular embodiments of the invention have been shown and described, modifications may be made, and it is intended in the appended claims to cover all such modifications as may fall within the true spirit and scope of the invention.

I claim:

1. In a subscription television system for translating a television signal including video-signal components in recurring trace intervals and synchronizing-signal components in intervening retrace intervals: an encoding device having a plurality of distinct operating conditions each of which establishes a different operating mode in said system; a control mechanism coupled to said encoding device and responsive to an applied control signal for effecting actuation of said encoding device between said operating conditions to encode said television signal in accordance with a predetermined code schedule; means for applying a periodic control signal to said control mechanism to effect said actuation of said encoding device in a predetermined periodic repeating sequence; means for developing during at least some of said retrace intervals reset signals individually representing different reset information and collectively representing a predetermined reset schedule; and means coupled to said control mechanism and responsive to said reset signals for interrupting said periodic sequence and effecting actuation of said encoding device during each of said last-mentioned retrace intervals to reset said encoding device to different operating conditions as determined at least in part by said reset information thereby to modify said code schedule in accordance with said reset schedule.

2. In a subscription television system for translating a television signal including video-signal components in recurring field-trace intervals and synchronizing-signal components in intervening field-retrace intervals: an encoding device having a plurality of distinct operating conditions each of which establishes a different operating mode in said system; a control mechanism coupled to said encoding device and responsive to an applied control signal for effecting actuation of said encoding device between said operating conditions to encode said television signal in accordance with a predetermined code schedule; means for applying a periodic control signal to said control mechanism to effect said actuation of said encoding device in a predetermined periodic repeating sequence; means for developing during at least some of said field-retrace intervals reset signals individually representing different reset information and collectively representing a predetermined reset schedule; and means coupled to said control mechanism and responsive to said reset signals for interrupting said periodic sequence and effecting actuation of said encoding device during each of said last-mentioned field-retrace intervals to reset said encoding device to different operating conditions as determined at least in part by said reset information thereby to modify said code schedule in accordance with said reset schedule.

3. In a secrecy communication system for translating an intelligence signal: an encoding device having a plurality of distinct operating conditions each of which establishes a different operating mode in said system; a control mechanism coupled to said encoding device and responsive to an applied control signal for effecting actuation of said encoding device between said operating conditions to encode said intelligence signal in accordance with a predetermined code schedule; means for applying a control signal to said control mechanism to effect said actuation of said encoding device in a predetermined periodic repeating sequence; means for developing during each of a series of spaced reset-time intervals reset signals individually representing different reset information and collectively representing a predetermined reset schedule; and additional means coupled to said control mechanism and responsive to said reset signals for interrupting said periodic sequence and effecting actuation of said encoding device during each of said reset-time intervals to reset said encoding device to different ones of said operating conditions as determined at least in part by said reset information thereby to modify said code schedule in accordance with said reset schedule.

4. In a subscription television system for translating a television signal having a series of field-trace intervals recurring at a predetermined field-scanning frequency: an encoding device having a plurality of distinct operating conditions each of which establishes a different operating mode in said system; a control mechanism coupled to said encoding device and responsive to an applied control signal for effecting actuation of said encoding device between said operating conditions to encode said television signal in accordance with a predetermined code schedule; means for applying a periodic control signal of a frequency greater than said field-scanning frequency to said control mechanism to effect said actuation of said encoding device in a predetermined periodic repeating sequence and at a rate faster than said field-scanning frequency; means for developing during each of a series of spaced reset-time intervals reset signals individually representing different reset information and collectively representing a predetermined reset schedule; and additional means coupled to said control mechanism and responsive to said reset signals for interrupting said periodic sequence and effecting actuation of said encoding device during each of said reset-time intervals to reset said encoding device to different ones of said operating conditions as determined at least in part by said reset information thereby to modify said code schedule in accordance with said reset schedule.

5. In a subscription television system for translating a subscription television signal having video components included within a recurring series of line-trace intervals constituting successive image fields and further having intervening line-synchronizing components: an encoding device having a plurality of distinct operating conditions each of which establishes a different time relation between said video and synchronizing components of said television signal; a pulse-signal source for developing pulses recurring at a rate greater than the recurrence rate of said image fields and individually representing one of said line intervals; a pulse-actuated control mechanism coupled to said pulse-signal source and said encoding device and responsive to the application of said pulses from said source for effecting actuation of said encoding device between said operating conditions in a predetermined periodic repeating sequence to encode said television signal in accordance with a prescribed code schedule; means for developing during each of a series of reset-time intervals reset signals individually representing different reset information and collectively representing a predetermined reset schedule; and additional means coupled to said control mechanism and responsive to said reset signals for interrupting said periodic sequence and effecting actuation of said encoding device during each of said reset-time intervals to reset said encoding device to different ones of said operating conditions as determined at least in part by said reset information thereby to modify said code schedule in accordance with said reset schedule.

6. In a subscription television system for translating a television signal including video-signal components in recurring trace intervals and synchronizing-signal components in intervening retrace intervals: an encoding device having a plurality of distinct operating conditions each of which establishes a different operating mode in said system; a control mechanism coupled to said encoding device and responsive to an applied control signal for effecting actuation of said encoding device between said operating conditions to encode said television signal in accordance with a predetermined code schedule; means for applying a periodic control signal to said control mechanism to effect said actuation of said encoding device in a predetermined periodic repeating sequence; means for developing during certain ones of said retrace intervals reset signals individually comprising a combination of code signal components each having a pretermined identifying characteristic and collectively representing reset information in accordance with their sequence within the combination, said reset signals representing a predetermined reset schedule; means responsive to said identifying characteristics for separating said code signal components from one another; and means coupled to said control mechanism and responsive to the separated code signal components for interrupting said periodic sequence and effecting actuation of said encoding device during each of said last-mentioned retrace intervals to reset said encoding device to different operating conditions as determined at least in part by said reset information thereby to modify said code schedule in accordance with said reset schedule.

7. In a secrecy communication system for translating an intelligence signal; an encoding device having a plurality of operating conditions each of which establishes a different operating mode in said system; a control mechanism coupled to said encoding device for effecting actuation thereof between said operating conditions; means for deriving a series of code signal components individually having a predetermined identifying characteristic and collectively determining a code schedule in accordance with their sequence within said series; means for utilizing said series of code signal components to control the operation of said control mechanism in accordance with said code schedule effectively to encode said intelligence signal; means for deriving a reset signal component having an identifying characteristic identical to that of one of said code signal components; and means for utilizing said reset signal component for resetting at least a portion of said control mechanism to a predetermined reference condition.

8. In a subscription television system for translating a television signal; an encoding device having a plurality of operating conditions each of which establishes a different operating mode in said system; a control mechanism coupled to said encoding device for effecting actuation thereof between said operating conditions; means for deriving a series of code signal components individually having a predetermined frequency and collectively determining a code schedule in accordance with their sequence within said series; means for utilizing said series of code signal components to control the operation of said control mechanism in accordance with said code schedule effectively to encode said television signal; means for deriving a reset signal component having an identifying frequency identical to that of one of said code signal components; and means for utilizing said reset signal component for resetting at least a portion of said control mechanism to a predetermined reference condition.

9. In a subscription television transmitter for transmitting a television signal including video-signal components in recurring trace intervals and synchronizing-signal components in intervening retrace intervals: a coding device having a plurality of distinct operating conditions each of which establishes a different operating mode in said transmitter; a control mechanism coupled to said coding device and responsive to an applied control signal for effecting actuation of said coding device between said operating conditions to code said television signal in accordance with a predetermined code schedule; means for applying a periodic control signal to said control mechanism to effect said actuation of said coding device in a predetermined periodic repeating sequence; means for developing during at least some of said retrace intervals reset signals individually representing different reset information and collectively representing a predetermined reset schedule; and means coupled to said control mechanism and responsive to said reset signals for interrupting said periodic sequence and effecting actuation of said coding device during each of said last-mentioned retrace intervals to reset said coding device to different operating conditions as determined at least in part by said reset information thereby to modify said code schedule in accordance with said reset schedule.

10. In a subscription television transmitter for transmitting a television signal including video-signal components in recurring field-trace intervals and synchronizing-signal components in intervening field-retrace intervals: a coding device having a plurality of distinct operating conditions each of which establishes a different operating mode in said transmitter; a control mechanism coupled to said coding device and responsive to an applied control signal for effecting actuation of said coding device between said operating conditions to code said television signal in accordance with a predetermined code schedule; means for applying a periodic control signal to said control mechanism to effect said actuation of said coding device in a predetermined periodic repeating sequence; means for developing during certain ones of said field-retrace intervals reset signals individually comprising a combination of code signal components each having a predetermined identifying characteristic and collectively representing reset information in accordance with their sequence within the combination, said reset signals representing a predetermined reset schedule; means for transmitting said reset signals to subscriber receivers; means responsive to said identifying characteristics for separating said code signal components from one another; and means coupled to said control mechanism and responsive to the separated code signal components for interrupting said periodic sequence and effecting actuation of said coding device during each of said last-mentioned field-retrace intervals to reset said coding device to different operating conditions as determined at least in part by said reset information thereby to modify said code schedule in accordance with said reset schedule.

11. In a secrecy communication receiver for utilizing a coded intelligence signal: a decoding device having a plurality of distinct operating conditions each of which establishes a different operating mode in said receiver; a control mechanism coupled to said decoding device and responsive to an applied control signal for effecting actuation of said decoding device between said operating conditions; means for applying a control signal to said control mechanism to effect said actuation of said decoding device in a predetermined periodic repeating sequence to effect partial decoding of said intelligence signal; means for developing during each of a series of spaced reset-time intervals reset signals individually representing different reset information and collectively representing a predetermined reset schedule; and additional means coupled to said control mechanism and responsive to said reset signals for interrupting said periodic sequence and effecting actuation of said decoding device during each of said reset-time intervals to reset said decoding device to different ones of said operating conditions as determined at least in part by said reset information, thereby effectively to completely decode said intelligence signal.

12. In a subscription television receiver for utilizing a television signal including video-signal components in recurring field-trace intervals and synchronizing-signal components in intervening field-retrace intervals, and coded in accordance with a coding schedule, said television signal also including during certain ones of said field-retrace intervals reset signals individually comprising a combination of code signal components each having a predetermined identifying characteristic, related to said coding schedule, said receiver comprising: a decoding device having a plurality of distinct operating conditions each of which establishes a different operating mode in said receiver; a control mechanism coupled to said decoding device and responsive to an applied control signal for effecting actuation of said decoding device between said operating conditions; means for applying a periodic control signal to said control mechanism to effect said actuation of said decoding device in a predetermined periodic repeating sequence to effect partial decoding of said television signal; means for deriving said code signals from said television signal; means responsive to said identifying characteristics for separating said code signal components from one another; and means coupled to said control mechanism and responsive to the separated code signal components for interrupting said periodic sequence and effecting actuation of said decoding device during each of said last-mentioned field-retrace intervals to reset said decoding device to different operating conditions effectively to completely decode said television signal.

13. In a secrecy communication system for translating an intelligence signal: an encoding device having a plurality of distinct operating conditions each of which establishes a different operating mode in said system; a control mechanism coupled to said encoding device and responsive to an applied signal for effecting actuation of said encoding device between said operating conditions to encode said intelligence signal in accordance with a predetermined code schedule; means for applying a periodic signal to said control mechanism to effect said actuation of said encoding device in a predetermined periodic repeating sequence; and additional means coupled to said control mechanism for interrupting said periodic sequence and for resetting said encoding device to different ones of said operating conditions thereby to modify said code schedule.

14. In a secrecy communication system for translating an intelligence signal: an encoding device having a plurality of distinct operating conditions each of which establishes a different operating mode in said system; a control mechanism coupled to said encoding device and responsive to an applied control signal for effecting actuation of said encoding device between said operating conditions to encode said television signal in accordance with a predetermined code schedule; means for applying a control signal to said control mechanism to effect said actuation of said encoding device in a predetermined periodic repeating sequence; and additional means coupled to said control mechanism for interrupting said periodic sequence during each of a series of spaced reset-time intervals and for resetting said encoding device to different ones of said operating conditions to modify said code schedule.

15. In a subscription television system for translating a television signal having video components included within a recurring series of field-trace intervals: an encoding device having a plurality of distinct operating conditions each of which establishes a different operating mode in said system effectively to encode said television signal; a cycling mechanism having a plurality of operating steps in each cycle for producing a control signal having characteristic variations representing each step in each cycle; means coupling said cycling mechanism to said encoding device to actuate said device from one to another of its aforesaid operating conditions in response to at least some of said characteristic variations; means for effecting actuation of said cycling mechanism at a rate that is faster than the recurrence rate of said field-trace intervals thereby to effect corresponding faster-than-field rate operation of said encoding device; and additional means for resetting said cycling mechanism to different ones of said operating steps in accordance with a prescribed reset schedule.

16. In a subscription television system for translating a television signal including video-signal components in recurring trace intervals and synchronizing-signal components in intervening retrace intervals: an encoding device having a plurality of operating conditions each of which establishes a different operating mode in said system; a control mechanism coupled to said encoding device and responsive to an applied control signal for effecting actuation of said encoding device between said operating conditions to encode said television signal in accordance with a predetermined code schedule; means for applying a periodic control signal to said control mechanism to effect said actuation of said encoding device in a predetermined periodic repeating sequence; means for developing during at least some of said retrace intervals reset signals individually representing different reset patterns and collectively representing a predetermined reset schedule; and means coupled to said control mechanism and responsive to said reset signals for interrupting said periodic sequence and effecting actuation of said encoding device during each of said last-mentioned retrace intervals to reset said encoding device to different operating conditions as determined at least in part by the patterns of said reset signals thereby to modify said code schedule in accordance with said reset schedule.

17. A subscription television system comprising: means for developing a television signal; encoding apparatus coupled to said television-signal-developing means and including first and second encoding devices individually responsive to an applied signal for varying a characteristic of said television signal to effect encoding thereof; means including a manually adjustable code selector for developing two different actuating signals representing first and second different code schedules as determined at least in part by the instantaneous adjustment of said code selector; and means for utilizing said actuating signals for effecting operation of said first and second encoding devices in accordance with said first and second code schedules, respectively, to develop an encoded television signal.

References Cited in the file of this patent

UNITED STATES PATENTS

| | | |
|---|---|---|
| 2,619,530 | Roschke | Nov. 25, 1952 |
| 2,656,407 | Herrick et al. | Oct. 20, 1953 |
| 2,697,741 | Roschke | Dec. 21, 1954 |
| 2,816,156 | Pawley | Dec. 10, 1957 |